Patented Mar. 5, 1935

1,993,511

UNITED STATES PATENT OFFICE 1,993,511

STABILIZATION OF BEVERAGES AND OTHER LIQUIDS

George Grindrod, Oconomowoc, Wis.

No Drawing. Application October 30, 1934, Serial No. 750,739

19 Claims. (Cl. 99—11)

This invention relates to a product and to a process for the stabilization of beverages and other liquids against separation of insoluble constituents, the application being in part a continuation of my former application Serial No. 390,205, filed September 30, 1929.

Many beverages contain insoluble materials, such as fibrous or cellular constituents, which tend to settle, and fat, which tends to rise to the top of the main body of liquid in solution, and seriously impair the appearance of the beverage, and to some extent, its palatability, when stored, bottled or packaged and kept for future consumption. Typical examples are the cocoa and chocolate beverages.

Various attempts have been made in the past to prevent such separation of the insoluble material, but differences in specific gravity and the desirability of marketing the product in liquid form and as a beverage which is attractive in appearance and of the same palatability as the freshly made product, have given rise to serious problems not heretofore satisfactorily solved. Stability against separation of ingredients, particularly solids, stability against coagulation, stability against flocculation or coalescence of particles dispersed or subdivided during the treatment, and sterility, are all requirements which vary in importance under varying conditions of storage, transportation, distribution, and use, and my process is subject to corresponding variations.

The invention herein disclosed has for one object the production of a stable, sterile beverage of the described class, which can be stored, transported and marketed without deterioration or impairment of the original appearance, flavor, or palatability.

Another object is to connect the insoluble constituents of a liquid or bring them into relation to each other in such a manner that the average specific gravity of a group containing constituents of relatively high and low specific gravities will, in general, average substantially the same as that of the surrounding or main body of the liquid in which they are contained.

It is my present understanding that by combining insoluble material of relatively low specific gravity with other material of relatively high specific gravity in hydrated embedding or connecting material, it is possible to average the specific gravity of the so combined material in substantial correspondence with the specific gravity of the surrounding liquid and thus produce a stable beverage regardless of viscosity, and in fact without material change in viscosity, appearance, flavor or any other characteristic affecting the taste or nutritive value of the product as compared with that of the beverage when freshly manufactured in the ordinary manner.

It is well known that insoluble particles may be dispersed by homogenization or by the use of steam jets as set forth in my former patent hereinafter referred to and the energy employed to effect such dispersion may also be utilized to cause an adsorption of certain other material upon the dispersed particles. Protein material may thus be utilized to stabilize the dispersed particles against flocculation or coalescence, and in fact any material capable of adsorption will accomplish that purpose to some extent.

I have discovered that in addition to ordinary adsorption such as accompanies the dispersion of solids in a liquid containing protein or any material capable of adsorption upon the dispersed solids in a liquid medium to which a high degree of energy is applied to effect the dispersion, it is possible to bring about adsorption upon such solids of relatively large masses of hydrated material which are nevertheless sufficiently minute to be invisible to the naked eye and incapable of materially affecting the fluidity of the mass. My object is to provide means for bringing about such hydration in a manner to stabilize beverages against the separation of contained insoluble material such as the fats and fibrous materials contained in cocoa or chocolate beverages.

Another object is to provide means whereby beverages of the described class may be stabilized against either coagulation or separation of the ingredients during pasteurization, sterilization, transportation or storage, and all the desirable characteristics of the freshly made beverage retained indefinitely.

Freshly made chocolate beverages with which I am familiar have a viscosity of approximately 1.1 or 1.2 times that of water unless artificially thickened by coagulation or the addition of a thickening agent. In general, it may be said that the rate of separation of an insoluble article will vary in time with the viscosity of the liquid, but no point of balanced suspension will ever be reached. However, a two or three fold increase in viscosity by addition of a thickening agent or some change in the constituents, such as coagulation of the milk ordinarily contained therein, will retard separation of fats and fibre sufficiently for some commercial purposes, although such beverages are not as satisfactory to persons of delicate taste or those whose desires are affected by the appearance of the beverage, and for these reasons commercial demand has been limited.

My process enables me to wholly avoid material thickening or increase in viscosity. In the manufacture of a cocoa or chocolate milk beverage I proceed as follows.

To prepare a mixture containing about 3% of cocoa, (chocolate), 5% of skim milk, 11% of sugar, and water in sufficient quantity to make a batch of about 1000 pounds, I take approximately 30 lbs. of cocoa containing about 30% fat, I add 110 lbs. of cane sugar and 50 lbs. of skim milk powder, preferably a skim milk powder that does not have its albumen coagulated, I add thereto about ½ lb. to 1 lb. of dry agar, whereupon I mix in 800 lbs. of water, a mechanical agitator being preferably employed. I have found it possible to reduce the quantity of agar to .04%, and in some cases even less, and still achieve very satisfactory stabilization.

The water may be preheated, or cold water may be used, and the mixture then heated to a sufficient temperature to put the soluble ingredients, including the agar, into solution. The mixture may be heated by live steam injected at the bottom to simultaneously heat and agitate, although indirect heat and mechanical agitation will be found equivalent.

After thus preparing the solution the mixture is homogenized. If sterilization is desired the heated batch may be drawn into a sterilizer of the general type disclosed in my former Patent No. 1,714,597, dated May 28, 1929, and steam injected at high velocity in the manner set forth in said former patent, whereby the insoluble material may be dispersed, protein material adsorbed upon the dispersed particles to stabilize them against flocculation or coalescence, and to sterilize the mixture sufficiently to prevent deterioration under conditions of commercial storage and transportation. By sterilizing the mixture in this manner I avoid danger of coagulation and objectionable thermo-chemical or flavor change.

If sterilization is not required, steam may be injected in the same manner at a lower temperature and for a shorter period, or any other means may be employed to accomplish the desired degree of dispersion. The use of homogenizers for sub-dividing and dispersing such solid materials is well known in the art, and it will be obvious to those skilled in the art that homogenizers will be equivalent for the steam treatment in this regard. It will, of course, be understood that dispersion will be largely, if not wholly, accomplished while the temperature is sufficient to maintain the agar content in solution.

After dispersion, and such adsorption of protein material upon the dispersed solid materials as ordinarily occurs, the temperature will be reduced to a degree which will permit hydration and the mixture agitated, whereupon the presence of the minute quantity of agar will bring about additional adsorption of hydrated masses upon the particles. To a considerable extent the minute masses of hydrated material thus produced will contain both fat and fibre particles, the specific gravities of which are thus balanced against each other. While I believe that this is largely responsible for stabilization against flotation of fat particles and settlement of fibrous particles, I recognize the possibility that these hydrated masses may carry electrical charges which keep the hydrated masses in spaced relation by repulsion.

In many instances, particularly when sterilization is not desired, a concentrated solution of the soluble and insoluble ingredients may be first prepared, heated, and homogenized, either mechanically or by means of the described steam treatment, and then diluted by the addition of milk, water, or both. The term "milk" as herein used is to be understood to include whole milk, skim milk, or milk compounds. Pasteurized skim milk is often used in the manufacture of cocoa and chocolate beverages.

In case the mixture is not sterilized and particularly in cases where mechanical dispersion alone is to be relied upon, it is well known that the agar should be first put into solution and then added to the mixture before homogenization. This is because agar requires a higher temperature to put it into solution than that desirable for the milk, when a non-sterile product is being produced.

Bodies containing like electrical charges tend to repel each other, and in a suspension may prevent them from collecting or massing. But whatever may be the correct explanation, the result attained is a maintenance of a stability against separation of solids not heretofore existent in similar mixtures of the same fluidity and viscosity.

After dispersion of the solids, the material is preferably rapidly cooled to prevent thermal change. If dispersion has been accomplished by the steam treatment, any excess water of condensation may be removed by evaporation. Even in cases where the steam treatment has been used the material will preferably be passed through a homogenizer to additionally reduce the size of the fat globules and bring them more uniformly to a diameter of about five microns or less.

Homogenization will preferably take place when the material is at a temperature of at least 110 degrees F. If the material has not been sterilized, cooling prior to homogenization need not take place, since the mixture will not have been raised to a sterilizing temperature but will ordinarily have been heated merely to a temperature sufficient to put the agar into solution.

From the foregoing, it will be clear that success is not dependent upon the use of the specific apparatus disclosed in said former patent, and that stabilization against separation of particles by flotation or settlement is not in any way dependent upon sterilization. However, in cases where sterilization is desired I prefer to employ the above described steam treatment because of its effectiveness in avoiding or preventing coagulation at high temperatures and shortening the duration of the high temperature period during which thermo-chemical and flavor changes may occur.

From the homogenizer, the solution is passed through a cooler and into a storage tank where it is preferably analyzed for total solids, and distilled water added if necessary to bring the mixture to the desired proportions as hereinafter pointed out, after which it may be bottled or otherwise placed in containers suitable for commercial handling or delivery. The material, if sterilized, will ordinarily be handled under conditions of complete sterility after being delivered from the sterilizer. Where the conditions are such that re-infection is possible, the product may be again sterilized in the bottle or can. In any event, after the steam treatment, it is preferably allowed to stand in the container, at or below atmospheric temperature, until settling of the cocoa fibre has been substantially completed, after which the container is shaken sufficiently to redistribute the fibre or other material that has separated from the body of the liquid.

It is my present understanding of this particular aspect of the invention that this shaking brings about a reaction which stabilizes the particles against separation from the liquid.

Thus my process may be summarized as consisting of the following steps which may or may not occur in the order listed, and some of which may or may not take place simultaneously. After a warmed mixture containing milk, sugar, fat, vegetable fibres, (such as cocoa fibres), in the desired proportions, is mixed with water, what I term a hydrating agent, such as agar, is added in a quantity insufficient to bring about general hydration, and also insufficient to bring about coagulation under the contemplated treatment which is to follow.

Whether the ingredients are prewarmed or not, and whether the whole or only a part of the ultimate liquid content is present in the mixture, it is brought to the proper temperature for dissolving the soluble material, including the agar or other hydrating agent, and the solids are then dispersed to the desired degree and sterilized if a sterile product is to be produced. After cooling sufficiently to permit hydration of the adsorbed material, the mixture is agitated to bring about an adsorption of the hydrating material and the entanglement of particles of high specific gravity with those of low specific gravity as above described. Thereupon the mixture is brought to the proper concentration and bottled or packaged.

The reaction causes the hydrating agent to form new minute masses or particles comprising fat, water, fibre, and the hydrating agent. These particles or minute composite masses are visible under the microscope.

These minute, hydrated masses, and the more solid substances which they contain, tend to remain in suspension. In any such hydrated mass containing particles relatively high and relatively low in specific gravity as compared with the surrounding liquid, the buoyant particles are balanced against those which tend to settle. Also, I have found by microscopical examination some evidence which suggests that these hydrated masses contain electrical charges of the same polarity, whereby they are kept apart and thus made to remain in suspension in a liquid medium of substantially the same specific gravity.

Thus, with this process, I obtain a product which contains a mixture of particles having different specific gravities and different degrees of solubility stabilized against separation from the suspending medium and having a viscosity, degree of fluidity, and a flavor substantially like that of the untreated mixture.

While the proportionate quantity of the hydrating agent (agar or equivalent material) is so small as to avoid any tendency to convert the mass of material into a jelly, it is not negligible, but is sufficient to substantially increase, by artificial means, any tendency toward hydration which may normally exist in a mixture of the character described. To stabilize against separation, the solids must be embedded in hydrated masses of substantial size as compared with that of the solid or solids which they enclose. In the use of agar the percentage may be reduced below that stated above, and particularly so if any of the ingredients contain material having a tendency to cause hydration. But it will ordinarily not be desirable to materially increase the stated percentage. In the treatment of different ingredients or ingredients of different qualities the desirability of variation in the proportions stated may be determined by observation of the product initially made, and microscopic determination of the degree of adsorbed hydration.

The relatively large quantity of water entering into combination with the hydrating agent tends to equalize the specific gravity of each little mass with that of the surrounding liquid.

The smaller hydrated masses in which a true equalization in total specific gravity is less likely to be attained ordinarily contain solids invisible to the naked eye whether they tend to settle or rise.

I have also found that stabilization may be made more uniformly complete by exercising care in grinding, grading and regulating the quantity of fibre and the size of the individual particles. It is my present understanding that this is due to the fact that a more even distribution of the hydrating material is thus obtained, and if the masses tend to repel each other, the process of repulsion would thus be more nearly equalized.

As hereinbefore pointed out, the steam treatment employed for sterilizing the mixture, also stabilizes the albumen, casein and possibly agar against coagulation or coagulating tendencies, whereby subsequent sterilization in the bottle can take place without causing coagulation or any chemical or flavor change.

It will be clear from the foregoing that the process described produces a new product, a stable beverage containing particles having different specific gravities, and, as also pointed out, it may be made sterile without coagulation. It is my present understanding that the process involves a fundamentally different principle from that of coagulation or change of viscosity. By properly balancing the proportion of the various ingredients with reference to their specific gravities, it is possible, by my process, to bring about a condition of stability sufficient to satisfy commercial requirements for a highly fluid beverage. The degree to which this condition is attained is not dependent upon coagulation or viscosity, but upon the precision with which the product is compounded.

The process is applicable to combinations of chocolate and milk and to all similar beverages containing particles, the specific gravity of which may be balanced against each other in hydrated masses which, as a whole, will have the same specific gravity of the main body of liquid. Those skilled in the art will have no difficulty in adapting the process, as used in making a cocoa-milk beverage, to the requirements of other beverages of a similar nature but in which the percentage of fat and fibre or of other solids may very from those mentioned in this description. However, to amplify further the theory involved in the process, a more detailed description of my understanding of the reaction involved, and of what I term the hydrating or stabilizing agent will be given.

A hydrating agent is composed generally of organic matter which is capable of combining with many times its own weight of water. If sufficient quantity of a hydrating agent be placed in water, it may combine with all of the water and form a jelly. If an insufficient amount of hydrating agent is placed in water, it ordinarily will not undergo the hydration reaction, but will remain in true solution unless the hydration can be accomplished by some additional force.

For example, if 2% of gelatin is dissolved in hot water and allowed to cool, it will form a jelly, but if 1/10 of 1% of gelatin is dissolved in hot water and allowed to cool, no change can be observed. The gelatin remains in solution and its only effect on viscosity is that of the dissolved material and this is negligible. But if a hydrating agent is dissolved in water containing solid particles, and if the hydrating agent can be caused to undergo the hydration reaction when in dilute solution, it will attach itself to the particles, the tendency being to undergo hydration on the surfaces of the particles and not throughout the solution.

The hydration reaction which takes place in certain complex organic compounds is analogous to, and follows the same laws, as crystallization of simpler substances. Thus, a crystallizable substance in dilute solution will not undergo crystallization, but if by cooling or some other means, crystallization is initiated, then the substance will crystallize on the surfaces of any solid particle which may be present and will not ordinarily crystallize from the solution directly.

But whereas simpler compounds which crystallize do not ordinarily absorb many times their weight of water, the complex organic compounds, capable of hydration, frequently absorb 100 to 200 times their weight of water, and, instead of forming crystals, form gelatinous coatings on solid particles, or form a fibrous structure. While in solution, such organic compounds affect the viscosity to the same extent as any similar substances in solution, but after hydration they are withdrawn from the solution and no longer affect the viscosity of the fluid.

In the use of hydrating agents according to the herein described process, there is practically no change in either plasticity or viscosity of the product for the reason that the proportion of the hydrating agent to the total mixture is so small that when the hydration reaction takes place, with the resultant removal of this agent from solution, the gelatinous coatings which form on the solid particles are so small in proportion to the body of the surrounding liquid that the plasticity, viscosity, and appearance of the mixture as a whole is not materially altered, and its flavor is unchanged. While clusters of the embedded particles may be seen microscopically, the only difference apparent to the naked eye is that which becomes apparent after a period long enough to permit separation of an unprocessed mixture. After such a period the difference will be apparent for the reason that the unprocessed portion of the same mixture will be thick with chocolate fibre and very dark in color at the bottom, while at the top it will have a greasy appearance with floating masses of more or less discolored fats.

The portion of the mixture to which my process has been applied will show very little change from its original appearance, and no material change in viscosity or plasticity.

Such effect as does take place amounts to a theoretical reduction in true viscosity, although incommensurable, and it may be accomplished by a slight increase in plasticity. In actual practice, the change in plasticity, if measured by the flow method, may amount to a change of approximately 10%, or from 1.1 to 1.2 times water, for example. To stabilize by means of viscosity requires an increase of about 250%.

The effect of the hydrating agent, if it is first adsorbed on the surfaces of the particles is to produce enlarged bodies in which the solids are embedded. Adsorption takes place upon fat particles as well as upon particles of fibre, and connects these particles so that the fat does not separate upwardly but assists in floating the heavier particles. The connection of the various particles within the fluid may be seen microscopically. The hydrating agent itself is ordinarily invisible.

According to my observation, the foregoing results are not due merely to the fact that only a small percentage of agar is used. Some of the results, such as sterilization and dispersion, are due to the mode of treatment, whereby this small percentage of agar is utilized efficiently, and whereby the more solid particles in the solution are put into condition to be readily united by the agar with the water of combination and produce the described hydrated masses.

Heretofore, the use of agar in the manufacture of a beverage of the described class would ordinarily involve the addition of agar or equivalent thickening material to the extent of about ½ of 1% in the case of agar, and while it served as an excellent thickening agent, it also coagulated the casein of the milk, and sterilization of the beverage by the ordinary methods resulted in a product which was decidedly thick, grainy and somewhat gelatinous.

If the percentage of agar were reduced to that specified for my process, without other change in the methods of retort sterilization heretofore followed, coagulation in the granular form might still result, and in that event the coagulated particles of agar and casein would ordinarily tend to settle and would fail to prevent the rising of many fat globules to the surface. In fact, such a small percentage of agar would have little effect except to hasten coagulation in the manufacture of sterile chocolate beverages by the methods heretofore used.

But my process makes possible the efficient use of this small percentage of agar, in the production of either sterile or unsterile products, without causing coagulation, without material change in viscosity and with only a negligible change in plasticity.

My invention may be used for many purposes in the treatment of liquid materials having insoluble particles which tend to separate. In cases where the particles of either relatively high or relatively low specific gravity predominate, or are contained alone, it will ordinarily be possible to add particles of material, neutral or otherwise, with a view of providing hydrated masses of average specific gravity equal to the body of the liquid in which such masses are contained. For example, in a beverage deficient in fat, but containing particles of greater specific gravity than the body of liquid in quantities much greater than the fat content, it will usually be possible to add fat or to add a neutral material of low specific gravity to be connected to the heavier particles by hydration as herein described.

I claim:

1. The process of stabilizing beverages against separation of solids contained therein, which consists in homogenizing insoluble material in a liquid medium containing such proportions of a hydrating agent in solution as to permit the embedding of the dispersed solids in minute masses of adsorbed hydrated material of such size with reference to the embedded solids as to support them in suspension without general hydration of the liquid in which they are contained and without material increase in viscosity, then cooling the mixture to a degree permitting such hydration and promoting adsorption of the hydrating material upon said solids by agitation.

2. That step in the process of stabilizing beverages against separation of insoluble material, which consists in dispersing such insoluble material generally to a degree of colloidal fineness obtainable by homogenization in a solution of beverage material containing a hydrating agent in a proportion insufficient to bring about general hydration but quantitatively calculated to bring about an adsorption of hydrated masses upon the dispersed solids of a size substantially capable of maintaining the dispersed solids in suspension without material increase in viscosity upon cooling the mixture to a degree permitting hydration during agitation.

3. A process for manufacturing a sterile, stable beverage mixture; consisting in dispersing to nearly colloidal fineness in a liquid medium a mixture containing insoluble material normally tending to separate from the medium, protein constituents of milk and the like normally tending to coagulate, and a quantity of hydrating agent insufficient to bring about general hydration or to bring about such hydration as to materially increase the viscosity of the mixture; treating the mixture to sterilize it, to denaturize the proteins, and to leave the hydrating agent ineffective to cause coagulation of the proteins; reducing the temperature of the mixture to arrest thermo-chemical change, and allowing it to stand; then agitating the mixture, whereby various constituents thereof react to stabilize it against separation.

4. The process of stabilizing liquids containing in suspension insoluble constituents having specific gravities above and below the specific gravity of the liquid to prevent normal gravital separation of such insoluble constituents, comprising the steps of adding to the liquid a hydrating material in a quantity insufficient to cause a material increase in the viscosity of the liquid, heat treating the liquid, dispersing insoluble constituents to the degree of fineness obtainable by homogenization and denaturizing any coagulable constituents present, cooling the liquid before material flavor and chemical change occurs, and agitating the liquid to cause various constituents thereof to react to stabilize it against separation.

5. The process of stabilizing beverages against gravital separation of soluble and insoluble constituents, consisting in providing an approximate balance of particles having relatively high and low specific gravity as compared with the solution, adding thereto a hydrating agent having the hydrating characteristics of agar in a quantity insufficient to cause general hydration, subjecting the material to the direct impact of high velocity steam jets in quantity sufficient to sterilize it at a temperature of about 240° F. before objectionable thermal changes can take place, and then cooling and agitating the material to initiate hydration upon said particles to produce bodies of average specific gravity.

6. The process of preventing gravital separation of the soluble and insoluble constituents of beverages of the cocoa and chocolate group, consisting in adding thereto about one tenth of one percent of agar, passing steam through the mixture in volume, distribution and velocity sufficient to sterilize it before objectionable thermal changes take place, then quickly cooling and subsequently agitating the material to cause hydration about the insoluble particles and connect the fatty and fibrous particles in masses of substantially average specific gravity.

7. The process of stabilizing beverages containing in suspension fatty material of relatively low specific gravity and other insoluble material of relatively high specific gravity, consisting in adding to the beverage a hydrating agent in quantity insufficient to cause an increase in the viscosity of the beverage, subjecting the mixture to the action of high velocity steam jets to disperse the fatty particles and also to disperse the hydrating agent and to denaturize coagulable material, then quickly cooling and agitating the beverage to connect the insoluble particles in small hydrated bodies of substantially the same specific gravity as that of the liquid in which they are suspended.

8. A process for manufacturing a sterile, stable beverage mixture; consisting in preparing a mixture containing in suspension in a liquid medium constituents normally tending to separate from the suspension and containing protein constituents of milk or the like; adding to the mixture a quantity of hydrating agent insufficient to increase appreciably the viscosity of the mixture; treating the mixture with high velocity steam jets, as described; cooling the mixture to proper temperature, as described, and allowing it to stand; then agitating the mixture, whereby various constituents thereof react to stabilize it against separation.

9. A process for manufacturing a sterile, stable beverage; consisting in preparing a mixture containing in suspension in a liquid medium insoluble fat particles and fibre particles and protein constituents of milk or the like; adding to the mixture a quantity of a hydrating agent insufficient to increase appreciably the viscosity of the mixture; treating the mixture with high velocity steam jets, as described; cooling the mixture and allowing it to stand; then agitating the mixture whereby various constituents thereof react to stabilize the mixture against separation.

10. A process for manufacturing a stable beverage consisting in preparing a mixture of cocoa, skim milk, sugar and water containing substantially 3 percent of cocoa by weight and 5 percent of skim milk by weight; adding to the mixture 5/100 to $\frac{1}{10}$ percent of dry agar by weight; treating the mixture with high velocity steam jets as described; cooling the mixture and allowing it to stand; and then agitating the mixture to cause certain constituents thereof to react to stabilize the mixture against separation.

11. A process for manufacturing a stable beverage consisting in preparing a mixture of cocoa, skim milk, sugar and water containing substantially 3 percent of cocoa by weight and 5 percent of skim milk by weight; adding to the mixture 5/100 to $\frac{1}{10}$ percent of dry agar by weight; treating the mixture with high velocity steam jets; cooling and homogenizing the mixture; and then agitating it to stabilize the mixture against separation.

12. A process for manufacturing a stable beverage consisting in preparing a suspension of fat and fibre particles in a liquid medium containing proteins; adding to the suspension 5/100 to $\frac{1}{10}$ of a percent of a stabilizing agent; treating the mixture with high velocity steam jets as described; cooling and then agitating the mixture to cause certain constituents thereof to react to stabilize the mixture against separation.

13. A process of stabilizing liquids containing insoluble constituents having specific gravities greater than and less than the specific gravity of the suspending liquid medium, consisting in adding to the suspension a stabilizing agent in quantities insufficient to change the physical characteristics of the liquid medium; subjecting the mixture to the action of high velocity steam jets; cooling and agitating the liquid to cause reaction of the stabilizing agent with various constituents of said mixture to stabilize the mixture against separation.

14. A beverage of the cocoa and chocolate group having fat globules and particles of fibre connected by bodies of hydrated material connected in masses of hydrated material, the average specific gravity of which is substantially equal to that of the solution in which they are contained, said solution having a viscosity insufficient to materially retard separation of particles of different specific gravity when free from such masses of hydrated material.

15. A sterile beverage of the cocoa and chocolate group, having a milk content resistant to coagulation at temperatures of approximately 240° F. and containing hydrated masses in suspension with particles of fatty and fibrous material entangled therein with their relative differences in specific gravity balanced against each other to neutralize separating tendencies, said beverage having a viscosity substantially wholly determined by its milk, sugar, cocoa and water content in uncoagulated condition.

16. A protein containing beverage having therein insoluble particles suspended in a liquid medium, said particles having relatively high and low specific gravity as compared with that of the liquid medium, the particles being connected in small groups by adsorbed hydrated material and each group having substantially the same average specific gravity as that of the liquid medium of the beverage whereby the mixture is stabilized against separation.

17. A beverage comprising a solution which includes normally insoluble particles in suspension, some having specific gravities above and others below that of the solution, said particles being connected in small groups by hydrated material, said groups containing particles of the high as well as of the low specific gravities, whereby the average specific gravity of each group is made to approximate that of the solution in which the groups are suspended, the viscosity of the beverage being substantially equal to that of the solution without the addition of the hydrated material.

18. A stabilized beverage containing in permanent suspension cocoa fibres and fat globules in a liquid medium containing denatured proteins, said beverage also containing not materially exceeding $\frac{1}{10}$ percent agar, and the viscosity of the beverage being substantially the same as that of the raw beverage before the addition of the agar.

19. A beverage containing in permanent suspension insoluble particles of relatively high and low specific gravity as compared with that of the liquid in which they are suspended, said particles being embedded in minute hydrated masses of insufficient size to materially affect the viscosity of the beverage.

GEORGE GRINDROD.